E. A. WALL.
ADJUSTABLE GEAR WHEEL.
APPLICATION FILED JUNE 13, 1912.
1,040,063.
Patented Oct. 1, 1912.
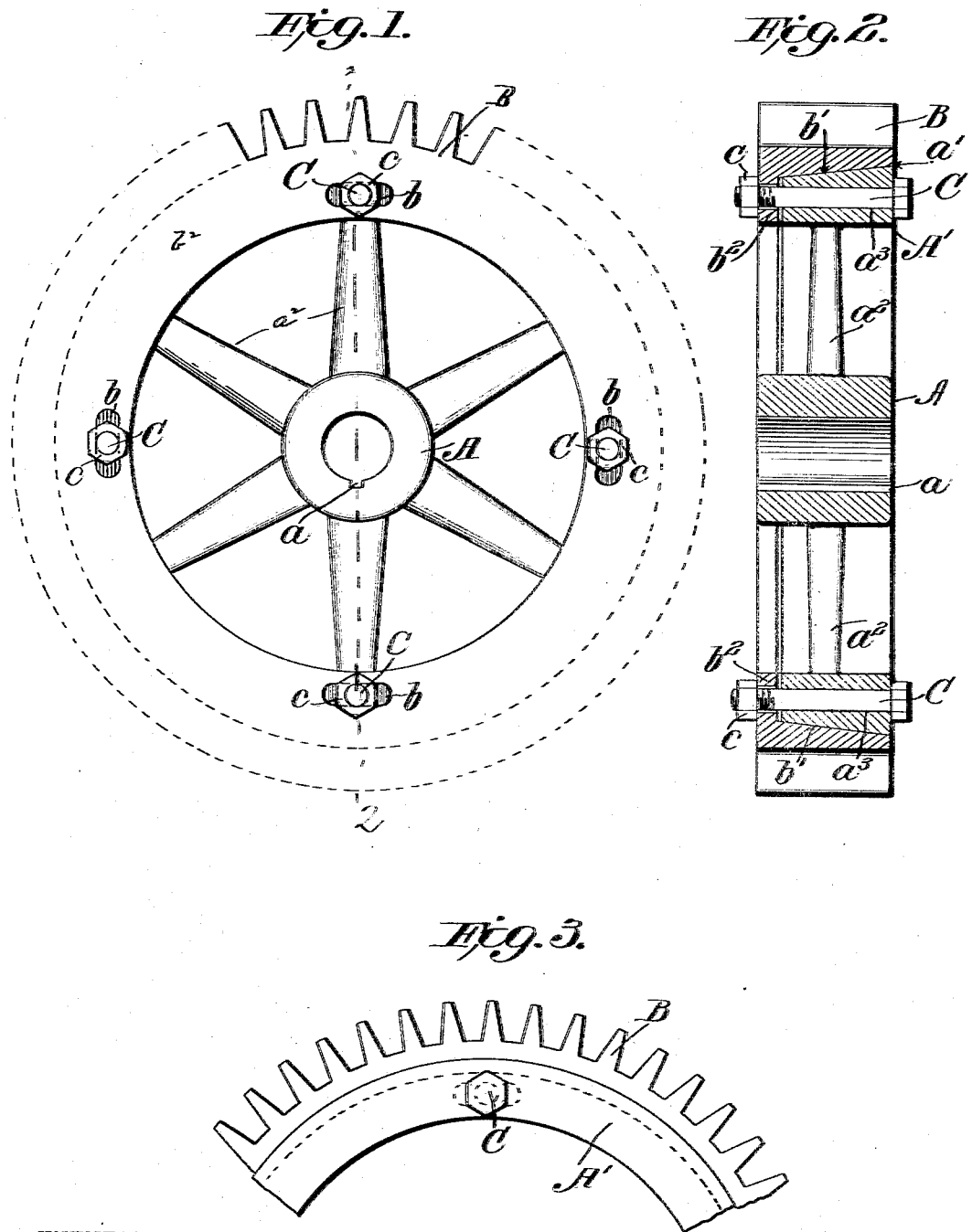
WITNESSES
INVENTOR
E. A. Wall
by Geo. E. Evans
Attorney

UNITED STATES PATENT OFFICE.

ENOS A. WALL, OF SALT LAKE CITY, UTAH.

ADJUSTABLE GEAR-WHEEL.

1,040,063.　　　　　Specification of Letters Patent.　　Patented Oct. 1, 1912.

Application filed June 13, 1912. Serial No. 703,511.

*To all whom it may concern:*

Be it known that I, ENOS A. WALL, a citizen of the United States, residing at Salt Lake City, in the county of Salt Lake and State of Utah, have invented certain new and useful Improvements in Adjustable Gear-Wheels, of which the following is a specification.

My invention relates to adjustable gear wheels.

The object of the invention is to provide a gear wheel with an outer toothed ring capable of being rotatively adjusted upon the periphery of a relatively fixed hub portion; the contacting surfaces of the two being correspondingly beveled and drawn together in fixed relation by laterally disposed bolts. This object I accomplish by the construction shown in the accompanying drawing, in which:

Figure 1 is a face view of my improved gear wheel. Fig. 2 is a transverse section on line 2—2 of Fig. 1, and Fig. 3 is a fragmentary view from the side opposite to Fig. 1.

A designates the hub having a key-slot $a$, by means of which it may be made fast to its shaft. The hub has an outer rim $A'$, the periphery of which is tapered, as at $a'$; the hub and its rim being connected by spokes $a^2$, or otherwise. The outer toothed portion B of the gear wheel is an annulus having its bore or inner wall tapered, as at $b'$, to receive the tapered rim $A'$, upon which it is drawn with a wedging action by a series of transverse bolts C. These bolts C pass through transverse apertures $a^3$ in the rim A, and through slots $b$, in a circular flange $b^2$, extending inwardly from the toothed ring B at the base of the inclined inner face or bore $b'$ thereof. By loosening the nuts $c$ on bolts C the toothed ring B may be turned on the hub rim A, after which, by tightening the nuts, the two inclined surfaces $a'$, $b'$ may be forced toward each other until they bind firmly against all accidental relative movement. By this construction a very fine adjustment of the toothed member B is provided for and a construction is afforded in which accidental relative rotation is entirely obviated.

What I claim is:

As an improved article of manufacture, a gear wheel consisting in a relatively fixed hub provided with a rim having an inclined or tapered periphery, a rotatively adjustable toothed ring having a tapered bore fitting said inclined periphery and formed with an inwardly extending slotted flange around the inner end of its bore, and bolts extending through the flange slots and the rim for drawing the inclined surfaces together.

In testimony whereof I affix my signature in presence of two witnesses.

ENOS A. WALL.

Witnesses:
GEO. H. EVANS,
CARL REDMAN.